US010929576B2

(12) United States Patent
Ronagh et al.

(10) Patent No.: US 10,929,576 B2
(45) Date of Patent: Feb. 23, 2021

(54) METHOD FOR ESTIMATING THE THERMODYNAMIC PROPERTIES OF A QUANTUM ISING MODEL WITH TRANSVERSE FIELD

(71) Applicant: 1QB INFORMATION TECHNOLOGIES INC., Vancouver (CA)

(72) Inventors: Pooya Ronagh, Kitchener (CA); Anna Levit, Coquitlam (CA); Ehsan Zahedinejad, Richmond (CA); Daniel Crawford, Vancouver (CA)

(73) Assignee: 1QB INFORMATION TECHNOLOGIES INC., Vancouver (CA)

( * ) Notice: Subject to any disclaimer, the term of this patent is extended or adjusted under 35 U.S.C. 154(b) by 406 days.

(21) Appl. No.: 15/831,751

(22) Filed: Dec. 5, 2017

(65) Prior Publication Data

US 2018/0157775 A1    Jun. 7, 2018

Related U.S. Application Data

(60) Provisional application No. 62/430,078, filed on Dec. 5, 2016.

(51) Int. Cl.
*G06F 30/20* (2020.01)
*G06N 10/00* (2019.01)
(Continued)

(52) U.S. Cl.
CPC ............. *G06F 30/20* (2020.01); *G06N 10/00* (2019.01); *G06F 30/00* (2020.01); *G06F 30/30* (2020.01);
(Continued)

(58) Field of Classification Search
None
See application file for complete search history.

(56) References Cited

U.S. PATENT DOCUMENTS 8,421,053 B2    4/2013   Bunyk et al.
9,183,508 B2 *  11/2015  King .................. G06F 15/76
(Continued)

FOREIGN PATENT DOCUMENTS

JP    2015-114354    6/2015
WO    2017/047666    3/2017

OTHER PUBLICATIONS

"Thermodynamics Properties of the Ising Model", pp. 1-11, 2007, (Year: 2007).*

(Continued)

*Primary Examiner* — Kibrom K Gebresilassie
(74) *Attorney, Agent, or Firm* — Wiggin and Dana LLP; Gregory S. Rosenblatt (57) ABSTRACT

A method for estimating a thermodynamic property of a quantum Ising model with transverse field is disclosed. The method comprises obtaining an indication of a thermodynamic property to approximate for the quantum Ising model with transverse field; obtaining data representative of the quantum Ising model with transverse field; setting the quantum Ising model with transverse field using the obtained data representative of the quantum Ising model with transverse field on a quantum Ising model sampling device, the quantum Ising model sampling device being operatively coupled to a processing device and to a quantum Ising model sampling device control system; performing a plurality of measurements of the quantum Ising model with transverse field in a measurement axis using the quantum Ising model sampling device, each measurement providing a corresponding measured configuration; generating an effective classical Ising model corresponding to the quantum Ising model with (Continued)

transverse field; generating a plurality of effective configurations of the effective classical Ising model, each effective configuration comprising a set of more than one of the measured configurations; generating an approximation of the thermodynamic property of the effective classical Ising model using the generated plurality of effective configurations of the effective classical Ising model to approximate the thermodynamic property of the quantum Ising model with transverse field; and providing the approximation of the thermodynamic property.

38 Claims, 4 Drawing Sheets (51) Int. Cl.
G06F 111/10 (2020.01)
G06F 119/08 (2020.01)
G06F 30/30 (2020.01)
G06F 30/00 (2020.01)
G06N 7/00 (2006.01)

(52) U.S. Cl.
CPC ....... G06F 2111/10 (2020.01); G06F 2119/08 (2020.01); G06N 7/00 (2013.01)

(56) References Cited

U.S. PATENT DOCUMENTS

| | | | |
|---|---|---|---|
| 9,411,026 B2 | 8/2016 | Yamamoto et al. | |
| 9,830,555 B2 | 11/2017 | Marandi et al. | |
| 2005/0256007 A1* | 11/2005 | Amin | G06N 10/00 505/170 |
| 2006/0225165 A1 | 10/2006 | Maassen Van Den Brink et al. | |
| 2009/0094618 A1* | 4/2009 | Huntsman | H04L 63/1408 719/318 |
| 2009/0112486 A1* | 4/2009 | Lustig | G16C 20/30 702/27 |
| 2009/0112546 A1* | 4/2009 | Lustig | G16C 20/30 703/12 |
| 2010/0190198 A1* | 7/2010 | Kibar | B01J 19/087 435/29 |
| 2014/0046626 A1* | 2/2014 | Yamamoto | B82Y 10/00 702/151 |
| 2015/0046681 A1* | 2/2015 | King | G06N 10/00 712/42 |
| 2015/0111754 A1* | 4/2015 | Harris | G06N 10/00 505/170 |
| 2015/0363708 A1* | 12/2015 | Amin | G06N 10/00 712/42 |
| 2016/0004972 A1* | 1/2016 | Alboszta | G06N 7/005 706/52 |
| 2016/0071021 A1 | 3/2016 | Raymond | |
| 2016/0162798 A1 | 6/2016 | Marandi et al. | |
| 2017/0024658 A1* | 1/2017 | Utsunomiya | G06N 5/02 |
| 2017/0068632 A1* | 3/2017 | Yoshimura | G06F 1/3296 |
| 2017/0161612 A1* | 6/2017 | Hastings | G06N 5/003 |
| 2017/0364362 A1* | 12/2017 | Lidar | G06F 9/3016 |
| 2018/0157775 A1* | 6/2018 | Ronagh | G06F 30/20 |
| 2018/0165601 A1* | 6/2018 | Wiebe | G06F 7/523 |
| 2018/0218279 A1* | 8/2018 | Lechner | G06N 10/00 |
| 2018/0246393 A1* | 8/2018 | Inagaki | G06N 10/00 |
| 2018/0308007 A1* | 10/2018 | Amin | G06N 10/00 |
| 2019/0197426 A1* | 6/2019 | Kawano | G06N 10/00 |
| 2019/0362270 A1* | 11/2019 | Haener | G06F 30/327 |
| 2020/0050921 A1* | 2/2020 | Tamura | G06N 3/063 |
| 2020/0134502 A1* | 4/2020 | Anschuetz | G06N 7/08 |

OTHER PUBLICATIONS

X. Huang, Z. Yang, "TRansverse Ising model eiyj Multi-Impurity", vol. 381, May 2015, pp. 372-376. (Year: 2015).*
Bettina Heim, Troels F. Ronnow, Sergei V. Isakov, and Matthias Troyer, Quantum versus Classical Annealing of Ising Spin Glasses, pp. 1-5, 2014 (Year: 2014).*
Barone and Paterno, 1982, Physics and Applications of the Josephson Effect, John Wiley and Sons, New York; Martinis et al., 2002, Physical Review Letters 89, 117901.
Farhi, E. et al., "Quantum Adiabatic Evolution Algorithms versus Simulated Annealing" arXiv.org quant ph/0201031 (2002), pp. 1 16.
McGeoch, Catherine C. and Cong Wang, (2013), "Experimental Evaluation of an Adiabatic Quantum System for Combinatorial Optimization" Computing Frontiers, May 14 16, 2013 (http://www.cs.amherst.edu/ccm/cf14-mcgeoch.pdf).
Bian, Z., Chudak, F., Macready, W. G. and Rose, G. (2010), "The Ising model: teaching an old problem new tricks".
M. H., Andriyash, E., Rolfe, J., Kulchytskyy, B., and Melko, R. (2016), "Quantum Boltzmann Machine" arXiv:1601.02036.
Sallans, B. and Hinton G., "Reinforcement Learning with Factored States and Actions", J. Mach. Learn. Res. 5 (Dec. 2004), 1063-1088.
Levit et al, Free energy-based reinforcement learning using a quantum computer.
Dutta et al, Quantum phase transitions in traverse field spin models: From Statistical Physics to Quantum Information.
Iglovikov et al, Disorder Line and Incommensurate Floating Places in the Quantum Ising Model on an Anisotropic Triangular Lattice.
Fukumoto et al, Thermodynamic Properties of the Transverse-Crystal-Field Ising Model on a Δ Chain: Three Peak Structure in the Specific Heat.
EP 17877532.6—Supplementary European Search Report; dated Jul. 30, 2020.
Heim, Bettina et al.; "Quantum versus Classical Annealing of Ising Spin Glasses;" arXiv:1411.5693 vol. 1; pp. 1-5; Nov. 20, 2014.
Johnson, M.W. et al.; "Quantum annealing with manufactured spins;" Nature; vol. 473; No. 7346; pp. 194-198; May 12, 2011.
Martonak, Roman et al.; "Quantum annealing by the path-integral Monte Carlo method: The two-dimensional random Ising model;" Physical Review B; vol. 66; No. 9; pp. 094203-1-094203-8; Sep. 13, 2002.
Heim, Bettina et al.; "Quantum versus Classical Annealing of Ising Spin Glasses;" Supplementary Materials. Science Express, pp. 1-10; Mar. 12, 2015.
Baxter, Rodney J.; Exactly Solved Models in Statistical Mechanics; London: Academic Press Inc. [Harcourt Brace Jovanovich Publishers]; ISBN 978-0-12-083180-7; Entire Book, in particular Chapter 3, Thermodynamic Properties, pp. 39-42; 1982.
Canadian Intellectual Property Office; CA 3,041,780; Requisition by the Examiner; Jun. 15, 2020.

* cited by examiner

METHOD FOR ESTIMATING THE THERMODYNAMIC PROPERTIES OF A QUANTUM ISING MODEL WITH TRANSVERSE FIELD

CROSS-REFERENCE TO RELATED APPLICATION

The present patent application claims priority on U.S. Patent Application No. 62/430,078, filed on Dec. 5, 2017.

FIELD

The invention relates to computing. More precisely, this invention pertains to a method for estimating the thermodynamic properties of a quantum Ising model with transverse field.

BACKGROUND

Quantum Bits

A quantum bit (qubit) is a physical implementation of a quantum mechanical system represented on a Hilbert space and realizing at least two distinct and distinguishable eigenstates in a measurement basis, that represent two states of a quantum bit. A quantum bit is the analogue of the digital bit, where the ambient storing device may store two states $|0\rangle$ and $|1\rangle$ of a two-state quantum information, but also in superpositions $\alpha|0\rangle + \beta|1\rangle$ of the two states.

In various embodiments, a system manufactured to represent a qubit may have more than two eigenstates in which case the additional eigenstates are used to represent the two logical states by degenerate measurements. Various embodiments of implementations of qubits have been proposed: e.g., solid-state nuclear spins, measured and controlled electronically or with nuclear magnetic resonance, trapped ions, atoms in optical cavities (cavity quantum-electrodynamics), liquid state nuclear spins, electronic charge or spin degrees of freedom in quantum dots, superconducting quantum circuits based on Josephson junctions (see Barone and Paterno, 1982, *Physics and Applications of the Josephson Effect*, John Wiley and Sons, New York; Martinis et al., 2002, *Physical Review Letters* 89, 117901) and electrons on Helium.

Beside the measurement basis, the state of a qubit may consist of pure or mixed states in other independent basis as well. In the mathematical representation of it, the pure states of a qubit are represented by the 2-dimensional special unitary group su(2) or equivalently by the Bloch sphere, generated by the Pauli matrices $$\sigma^x = \begin{pmatrix} 0 & 1 \\ 1 & 0 \end{pmatrix},$$

$$\sigma^y = \begin{pmatrix} 0 & -i \\ i & 0 \end{pmatrix},$$

$$\sigma^z = \begin{pmatrix} 1 & 0 \\ 0 & -1 \end{pmatrix}.$$

According to one embodiment, in the mathematical modeling of the qubit, each of the states $|0\rangle$ and $|1\rangle$ of the qubit in the measurement basis corresponds to an eigenstate of the $\sigma^z$ Pauli matrix. The state of the qubit may be read out by probing an observable of the $\sigma^z$ Pauli matrix operator. An embodiment of a physical implementation of such a system is disclosed in U.S. Patent Application No. 2005/0256007.

Ising Model with Transverse Field

A classical Ising model is a system of particle spins with at most degree two interactions between the spins. The energy of a configuration $\sigma = (\sigma_1, \ldots, \sigma_d)$ of the spins is therefore expressed by the Hamiltonian $$H(\sigma) = -\sum_{i<j} J_{ij} \sigma_i \sigma_j - \sum_i h_i \sigma_i.$$

The linear coefficients $h_i$ are representative of local field biases on the spins $\sigma_i$ and the quadratic coefficients $J_{ij}$ are representative of coupling strengths between spins $\sigma_i$ and $\sigma_j$.

A quantum Ising model is a similar system of qubits. In one embodiment the spins, local field biases and coupling strengths are all considered in the z-direction. Therefore the Hamiltonian of the system can be expressed in terms of the z-Pauli matrices of the particles $\sigma_i^z$ and written as $$H = -\sum_{i<j} J_{ij} \sigma_i^z \sigma_j^z - \sum_i h_i \sigma_i^z.$$

A quantum Ising model with transverse field is a similar system in which a local field bias is imposed on each particular spin in a direction perpendicular to the measurement axis.

In one embodiment, the direction of the transverse field is the x-axis and the strength of the transverse field is denoted by $\Gamma$. In this embodiment, the Hamiltonian of the system is $$H = -\sum_{i<j} J_{ij} \sigma_i^z \sigma_j^z - \sum_i h_i \sigma_i^z - \Gamma \sum_i \sigma_i^x.$$

Quantum Processor

A quantum processor is a quantum mechanical system consisting of a plurality of manufactured qubits.

To each qubit is inductively coupled a source of bias called a local field bias. In one embodiment, a bias source is an electromagnetic device used to thread a magnetic flux through the qubit to provide control of the state of the qubit (see U.S. Patent Application No. 2006/0225165).

The local field biases on the qubits are programmable and controllable. In one embodiment, a qubit control system comprising a digital processing unit is connected to the system of qubits and is capable of programming and tuning the local field biases on the qubits.

A quantum processor may furthermore comprise a plurality of couplings between a plurality of pairs of the plurality of qubits. In one embodiment, a coupling between two qubits is a device in proximity of both qubits threading a magnetic flux to both qubits. In the same embodiment, a coupling may consist of a superconducting circuit interrupted by a compound Josephson junction. A magnetic flux may thread the compound Josephson junction and consequently thread a magnetic flux on both qubits (See U.S. Patent Application No. 2006/0225165). The strength of this magnetic flux contributes quadratically to the energies of the quantum Ising model with transverse field. In one embodiment, the coupling strength is enforced by tuning the coupling device in proximity of both qubits.

The coupling strengths are controllable and programmable. In one embodiment, a quantum processor control system comprising of a digital processing unit is connected to the plurality of couplings and is capable of programming the coupling strengths of the quantum processor.

In one embodiment, the quantum processor is a quantum annealer. A quantum annealer is described, for example, in Farhi, E. et al., "Quantum Adiabatic Evolution Algorithms versus Simulated Annealing" arXiv.org: quant ph/0201031 (2002), pp. 1-16.

Quantum annealers perform a transformation of the quantum Ising model with transverse field from an initial setup to a final one. The initial and final setups of the quantum Ising model with transverse field provide quantum systems described by their corresponding initial and final Hamiltonians.

Quantum annealers can be used as heuristic optimizers of their energy function. An embodiment of such an analog processor is disclosed by McGeoch, Catherine C. and Cong Wang, (2013), "Experimental Evaluation of an Adiabatic Quantum System for Combinatorial Optimization" Computing Frontiers," May 14-16, 2013 and also disclosed in U.S. Patent Application No. 2006/0225165.

With minor modifications to the quantum annealing process, quantum processors can instead be used to provide samples form the Boltzmann distribution of their Ising model in a finite temperature. The skilled addressee is referred to the technical report: Bian, Z., Chudak, F., Macready, W. G. and Rose, G. (2010), "The Ising model: teaching an old problem new tricks", and also Amin, M. H., Andriyash, E., Rolfe, J., Kulchytskyy, B., and Melko, R. (2016), "Quantum Boltzmann Machine" arXiv: 1601.02036.

This method of sampling is called quantum sampling.

Optical Computing Devices

Another embodiment of an analogue system capable of performing sampling from Boltzmann distribution of an Ising model near its equilibrium state is an optical device.

In one embodiment, the optical device comprises a network of optical parametric oscillators (OPOs) as disclosed for instance in U.S. Patent Application No. 2016/0162798 and in International Application No. WO 2015/006494 A1.

In this embodiment, each spin of the Ising model is simulated by an optical parametric oscillator (OPO) operating at degeneracy.

Degenerate OPOs are open dissipative systems that experience second order phase transition at the oscillation threshold. Because of the phase-sensitive amplification, a degenerate OPO could oscillate with a phase of either 0 or $\pi$ with respect to the pump phase for amplitudes above the threshold. The phase is random, affected by the quantum noise associated in optical parametric down conversion during the oscillation build-up. Therefore, a degenerate OPO naturally represents a binary digit specified by its output phase. Based on this property, a degenerate OPO system may be used as a physical representative of an Ising spin system. The phase of each degenerate OPO is identified as an Ising spin, with its amplitude and phase determined by the strength and the sign of the Ising coupling between relevant spins.

When pumped by a strong source, a degenerate OPO takes one of two phase states corresponding to spin 1 or −1 in the Ising model. A network of N substantially identical OPOs with mutual coupling are pumped with the same source to simulate an Ising spin system. After a transient period from introduction of the pump, the network of OPOs approaches to a steady state close to its thermal equilibrium.

The phase state selection process depends on the vacuum fluctuations and mutual coupling of the OPOs. In some implementations, the pump is pulsed at a constant amplitude, in other implementations the pump output is gradually increased, and in yet further implementations, the pump is controlled in other ways.

In one embodiment of an optical computing device, the plurality of couplings of the Ising model are simulated by a plurality of configurable couplings used for coupling the optical fields between OPOs. The configurable couplings may be configured to be off, or configured to be on. Turning the couplings on and off may be performed gradually or abruptly. When configured to be on, the configuration may provide any phase or amplitude depending on the coupling strengths of the Ising model.

Each OPO output is interfered with a phase reference and the result is captured at a photodetector. The OPO outputs represent a configuration of the Ising model. For example, a zero phase may represent a −1 spin state, and a $\pi$ phase may represent a 1 spin state in the Ising model.

For an Ising model with N spins, and according to one embodiment, a resonant cavity of the plurality of OPOs is configured to have a round-trip time equal to N times the period of N pulses from a pump source. Round-trip time as used herein indicates the time for light to propagate along one pass of a described recursive path. The N pulses of a pulse train with period P equal to 1/N of the resonator cavity round-trip time may propagate through the N OPOs concurrently without interfering with each other.

In one embodiment, the couplings of the OPOs are provided by a plurality of delay lines allocated along the resonator cavity.

The plurality of delay lines comprise a plurality of modulators which synchronously control the strengths and phases of couplings allowing for programming of the optical device to simulate the Ising model.

In a network of N OPOs, N−1 delay lines and corresponding modulators are enough to control amplitude and phase of coupling between every two OPOs.

In one embodiment, an optimal device, capable of sampling from an Ising model can be manufactured as a network of OPOs as disclosed in U.S. Patent Application No. 2016/0162798.

In one embodiment, the network of OPOs and couplings of OPOs can be achieved using commercially available mode locked lasers and optical elements such as telecom fiber delay lines, modulators, and other optical devices. Alternatively, the network of OPOs and couplings of OPOs can be implemented using optical fiber technologies, such as fiber technologies developed for telecommunications applications. The couplings can be realized with fibers and controlled by optical Kerr shutters.

Thermodynamic Properties of a Transverse Field Isinq Model

It will be appreciated that the partition function of a system, describes the properties of the system in thermodynamic equilibrium. The partition function is dependent on thermodynamic variables such as temperature. Many other thermodynamic properties of a system, such as the total energy, free energy, entropy, pressure, etc. of the system can be expressed in terms of or in relationship with the partition function.

In classical systems, the partition function is $$Z = \sum_c e^{-\beta H(c)}$$

where H(c) is the classical Hamiltonian of the system as the function of c, the configuration of system. $\beta$ is a constant inverse proportional to the temperature of the system:

$$\beta = \frac{1}{k_B T}$$

where $k_B$ is the Boltzmann constant.

In a quantum system the partition function is $$Z = tr(e^{-\beta H})$$

where H is the quantum mechanical Hamiltonian of the system.

The equilibrium free energy, abbreviated as the free energy, of the system is defined via $$F = -\frac{1}{\beta} \ln Z.$$

The free energy of a system is intuitively the amount of work that the system is capable of performing. It is the value of the total internal energy of the system minus the amount of energy of the system that cannot be used to perform work. The latter is called the entropy of the system.

For a quantum mechanical system, the entropy may be expressed in terms of the density matrix of the configurations of the system $$\rho = \frac{1}{Z} e^{-\beta H}$$

as follows:

$$S = -tr(\rho \ln \rho).$$

It will be appreciated that the internal energy, free energy, entropy and partition function of a classical or quantum system are examples of thermodynamic properties of the system.

The skilled addressee will appreciate that the thermodynamic properties of a system are important features of the system to be measured for applications in science and engineering.

For instance, calculating or approximating the free energy of a system is an important processing step for applications in machine learning (refer to Sallans, B. and Hinton G., "Reinforcement Learning with Factored States and Actions", *J. Mach. Learn. Res.* 5 (December 2004), 1063-1088).

It will be appreciated that for a quantum system, such as a quantum Ising model with transverse field, the computation of the thermodynamic property is a difficult technical problem since measuring the energy of the system at different configurations of it requires finding the spectrum of the quantum Hamiltonian which is not feasible for large systems.

There is therefore a need for a method that will overcome at least one of the above-identified drawbacks.

Features of the invention will be apparent from review of the disclosure, drawings, and description of the invention below.

BRIEF SUMMARY

According to a broad aspect, there is disclosed a method for estimating a thermodynamic property of a quantum Ising model with transverse field, the method comprising use of a processing device for obtaining an indication of a thermodynamic property to approximate for the quantum Ising model with transverse field; obtaining data representative of the quantum Ising model with transverse field; setting the quantum Ising model with transverse field using the obtained data representative of the quantum Ising model with transverse field on a quantum Ising model sampling device, the quantum Ising model sampling device being operatively coupled to the processing device and to a quantum Ising model sampling device control system; performing a plurality of measurements of the quantum Ising model with transverse field in a measurement axis using the quantum Ising model sampling device, each measurement providing a corresponding measured configuration; generating an effective classical Ising model corresponding to the quantum Ising model with transverse field; generating a plurality of effective configurations of the effective classical Ising model, each effective configuration comprising a set of more than one of the measured configurations; generating an approximation of the thermodynamic property of the effective classical Ising model using the generated plurality of effective configurations of the effective classical Ising model to approximate the thermodynamic property of the quantum Ising model with transverse field and providing the approximation of the thermodynamic property.

According to an embodiment, the quantum Ising model sampling device comprises a quantum processor being operatively coupled to the processing device and the quantum Ising model sampling device control system comprises a quantum processor control system; further wherein the quantum processor comprising a plurality of qubits and a plurality of couplers, each coupler for providing a communicative coupling at a crossing of two qubits.

According to an embodiment, the quantum Ising model sampling device comprises an optical computing device operatively coupled to the processing device and configured to receive energy from an optical energy source and generate a plurality of optical parametric oscillators, and a plurality of coupling devices, each of which controllably couples a plurality of optical parametric oscillators.

According to an embodiment, the quantum Ising model sampling device comprises a central processing unit operatively coupled to the processing device and a memory unit coupled to the central processing unit, the memory unit comprising an application for obtaining data representative of the quantum Ising model with transverse field; further wherein the application is adapted for performing a simulated quantum annealing of the quantum Ising model with transverse field.

According to an embodiment, the quantum Ising model sampling device comprises a reconfigurable digital hardware operatively coupled to the processing device, a central processing unit and a memory unit, the central processing unit and the memory unit coupled to the reconfigurable digital hardware and the reconfigurable digital hardware is adapted to perform a simulated quantum annealing of the quantum Ising model with transverse field.

According to an embodiment, the quantum Ising model with transverse field is characterized by a quantum Ising Hamiltonian with transverse field and the thermodynamic property of the quantum Ising model with transverse field comprises a partition function of the quantum Ising Hamiltonian with transverse field.

According to an embodiment, the quantum Ising model with transverse field is characterized by a quantum Ising Hamiltonian with transverse field and the thermodynamic property of the quantum Ising model with transverse field comprises an equilibrium free energy of the quantum Ising Hamiltonian with transverse field.

According to an embodiment, the quantum Ising model with transverse field is characterized by a quantum Ising Hamiltonian with transverse field and the thermodynamic property of the quantum Ising model with transverse field comprises an internal energy of the quantum Ising Hamiltonian with transverse field.

According to an embodiment, the quantum Ising model is characterized by a quantum Ising Hamiltonian with transverse field and the thermodynamic property of the quantum Ising model with transverse field comprises an entropy of the quantum Ising Hamiltonian with transverse field.

According to an embodiment, the effective classical Ising model comprises more than one replica of each spin of the quantum Ising model with transverse field projected on its measurement base.

According to an embodiment, the generating of each effective configuration for the effective classical Ising model comprises performing a random sampling of the plurality of measured configurations of the quantum Ising model with transverse field; each selected measured configuration corresponding to a replica of the effective classical Ising model.

According to an embodiment, the indication of a thermodynamic property to approximate for the quantum Ising model with transverse field is obtained from at least one of the processing device, a remote processing device operatively connected with the processing device and a user interacting with the processing device.

According to an embodiment, the thermodynamic property is selected from a group consisting of internal energy, free energy, entropy and partition function.

According to an embodiment, the generating of a plurality of effective configurations for the effective classical Ising model comprises providing a number m of replicas of the effective classical Ising model corresponding to the quantum Ising model with transverse field, until a stopping criterion is met: selecting m measured configurations of the quantum Ising model with transverse field, providing an effective configuration of the effective classical Ising model using the m measured configurations of the quantum Ising model with transverse field, by matching the m measured configurations with the m replicas and if the stopping criterion is met: providing the plurality of effective configurations of the effective classical Ising model.

According to an embodiment, the m measured configurations of the quantum Ising model with transverse field are selected randomly.

According to an embodiment, the matching between the m replicas and the m measured configurations is decided based on a Markov Chain Monte Carlo procedure, comprising first matching the m measured configurations to the m replicas uniformly at random and then performing a transition to a different arrangement with a Metropolis acceptance probability.

According to an embodiment, the stopping criterion comprises reaching a maximum number of samples of a classical effective Hamiltonian.

According to an embodiment, the stopping criterion comprises reaching a maximum runtime.

According to an embodiment, the stopping criterion comprises convergence of an approximation of the thermodynamic property of the quantum Ising model with transverse field.

According to a broad aspect, there is disclosed a digital computer for estimating a thermodynamic property of a quantum Ising model with transverse field, the digital computer comprising a central processing unit; a display device; a communication port for operatively connecting a quantum Ising model sampling device, the quantum Ising model sampling device operatively coupled to a quantum Ising model sampling device control system; a memory unit comprising an application for estimating a thermodynamic property of a quantum Ising model with transverse field, the application comprising instructions for obtaining an indication of a thermodynamic property to approximate for the quantum Ising model with transverse field, instructions for obtaining data representative of the quantum Ising model with transverse field, instructions for setting the quantum Ising model with transverse field using the obtained data representative of the quantum Ising model with transverse field on the quantum Ising model sampling device operatively coupled to the digital computer via the communication port, instructions for performing a plurality of measurements of the quantum Ising model with transverse field in a measurement axis using the quantum Ising sampling device, each measurement providing a corresponding measured configuration, instructions for generating an effective classical Ising model corresponding to the quantum Ising model with transverse field, instructions for generating a plurality of effective configurations of the effective classical Ising model, each effective configuration comprising a set of more than one of the measured configurations, instructions for generating an approximation of the thermodynamic property of the effective classical Ising model using the generated plurality of effective configurations of the effective classical Ising model to approximate the thermodynamic property of the quantum Ising model with transverse field, and instructions for providing the generated approximation of the thermodynamic property and a data bus for interconnecting the central processing unit, the display device, the communication port and the memory unit.

According to a broad aspect, there is disclosed a non-transitory computer-readable storage medium for storing computer-executable instructions which, when executed, cause a digital computer to perform a method for estimating a thermodynamic property of a quantum Ising model with transverse field, the method comprising use of a processing device for obtaining an indication of a thermodynamic property to approximate for the quantum Ising model with transverse field; obtaining data representative of the quantum Ising model with transverse field; setting the quantum Ising model with transverse field using the obtained data representative of the quantum Ising model with transverse field on a quantum Ising model sampling device, the quantum Ising model sampling device being operatively coupled to the processing device and to a quantum Ising model sampling device control system; performing a plurality of measurements of the quantum Ising model with transverse field in a measurement axis using the quantum Ising sampling device, each measurement providing a corresponding measured configuration; generating an effective classical Ising model corresponding to the quantum Ising model with transverse field; generating a plurality of effective configurations of the effective classical Ising model, each effective configuration comprising a set of more than one of the measured configurations; generating an approximation of the thermodynamic property of the effective classical Ising model using the generated plurality of effective configurations of the effective classical Ising model to approximate the thermodynamic property of the quantum Ising model with transverse field; and providing the approximation of the thermodynamic property.

An advantage of the method disclosed herein is that it provides a method for approximating a thermodynamic property of a quantum Ising model with transverse field.

Another advantage of the method disclosed herein is that it does not require finding the spectrum of the quantum Hamiltonian.

BRIEF DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION

In the following description of the embodiments, references to the accompanying drawings are by way of illustration of an example by which the invention may be practiced.

Terms

The term "invention" and the like mean "the one or more inventions disclosed in this application," unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the disclosed invention(s)," unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an," "the" and "at least one" mean "one or more," unless expressly specified otherwise.

The term "plurality" means "two or more," unless expressly specified otherwise.

The term "herein" means "in the present application, including anything which may be incorporated by reference," unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example," and thus do not limit the terms or phrases they explain. For example, in a sentence "the computer sends data (e.g., instructions, a data structure) over the Internet," the term "e.g." explains that "instructions" are an example of "data" that the computer may send over the Internet, and also explains that "a data structure" is an example of "data" that the computer may send over the Internet. However, both "instructions" and "a data structure" are merely examples of "data," and other things besides "instructions" and "a data structure" can be "data."

The term "i.e." and like terms mean "that is," and thus limit the terms or phrases they explain.

The term "analog computer" means a system comprising a quantum processor or an optical device, control systems of qubits, coupling devices, and a readout system, all connected to each other through a communication bus.

Neither the Title nor the Abstract is to be taken as limiting in any way as the scope of the disclosed invention(s). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

It will be appreciated that the invention may be implemented in numerous ways. In this specification, these implementations, or any other form that the invention may take, may be referred to as systems or techniques. A component such as a processor or a memory described as being configured to perform a task includes either a general component that is temporarily configured to perform the task at a given time or a specific component that is manufactured to perform the task.

With all this in mind, the present invention is directed to a method for estimating a thermodynamic property of a quantum Ising model with transverse field.

As mentioned above, it will be appreciated that the thermodynamic property of a quantum Ising model with transverse field is an important quantity in many applications.

In one embodiment, the thermodynamic property of the quantum Ising model may be estimated in order to perform a reinforcement learning algorithm for improving the best-known policy of a stochastic control problem as disclosed in U.S. patent application Ser. No. 15/590,614.

In such embodiment, the thermodynamic property of the quantum Ising model is the equilibrium free energy.

It will be appreciated by the skilled addressee that in its general form, thermodynamics is mostly concerned with heat and temperate and their fundamental relation with other properties of the system such as energy and work. For example, laser and photocell quantum heat engines are powered by thermal light and governed by the laws of quantum thermodynamics. Finding the thermodynamics properties of a physics system, i.e., partition function, free energy, of entropy are fundamentally important to create innovative efficient quantum and classical systems such that to maximize the resultant works from these systems with application from quantum machine learning to quantum material science.

In fact, it will be appreciated that the thermodynamic property of the quantum Ising model may be selected from a group consisting of internal energy, free energy, entropy and partition function.

Figure 1:
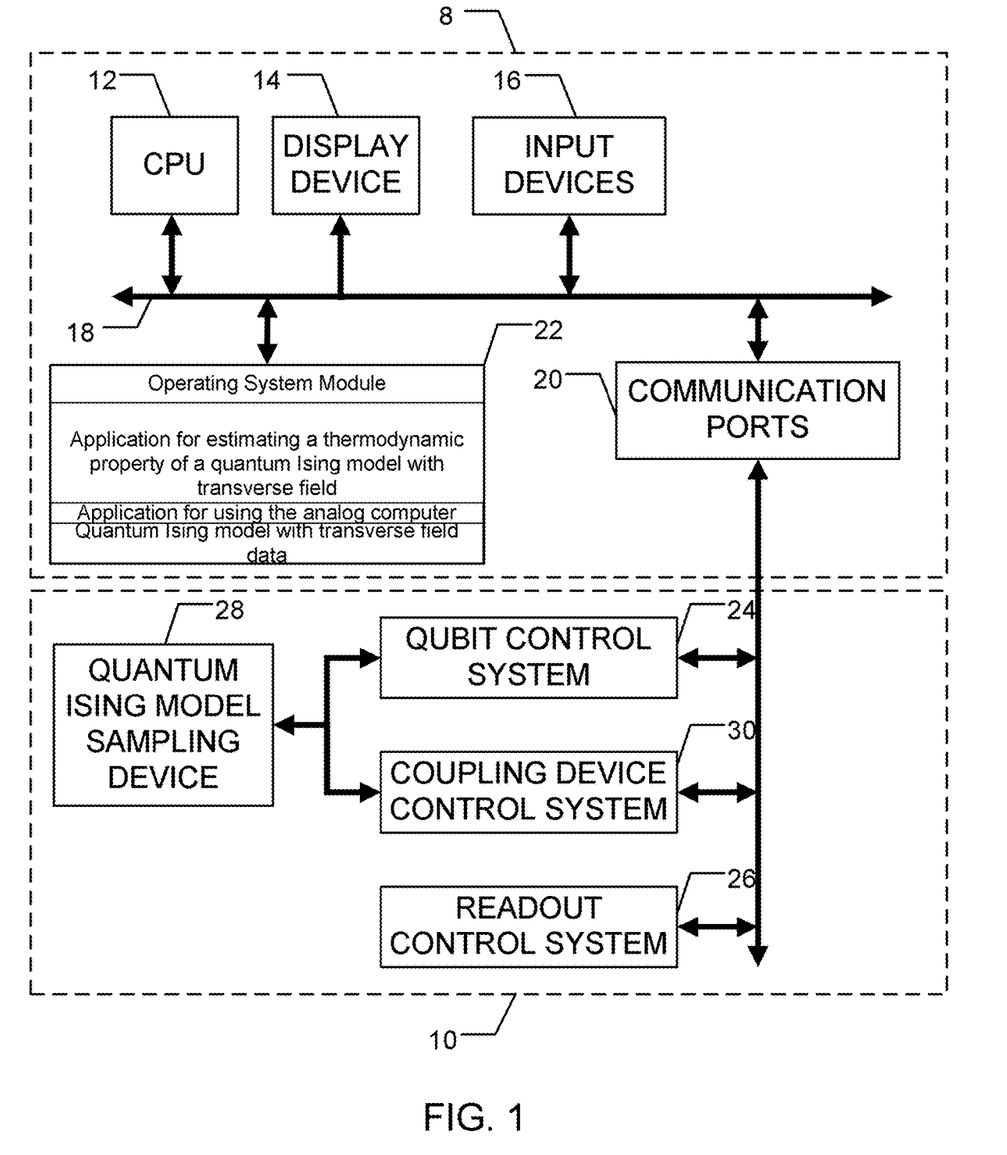
FIG. 1 is a diagram that shows an embodiment of a system comprising a digital computer coupled to a quantum Ising model sampling device.

Now referring to FIG. 1, there is shown a diagram that shows an embodiment of a system which may be used for implementing a method for estimating a thermodynamic property of a quantum Ising model with transverse field.

More precisely, the system comprises a digital computer 8 operatively coupled to an analog computer 10.

It will be appreciated that the digital computer 8 may be any type of digital computer.

In one embodiment, the digital computer 8 is selected from a group consisting of desktop computers, laptop computers, tablet PC's, servers, smartphones, etc. It will also be appreciated that, in the foregoing, the digital computer 8 may also be broadly referred to as a processing device.

In the embodiment shown in FIG. 1, the digital computer 8 comprises a central processing unit 12, also referred to as a microprocessor, a display device 14, input devices 16, communication ports 20, a data bus 18 and a memory 22.

The central processing unit 12 is used for processing computer instructions. The skilled addressee will appreciate that various embodiments of the central processing unit 12 may be provided.

In one embodiment, the central processing unit 12 comprises a CPU Core i5 3210 running at 2.5 GHz and manufactured by Intel™.

The display device 14 is used for displaying data to a user. The skilled addressee will appreciate that various types of display device 14 may be used.

In one embodiment, the display device 14 comprises a standard liquid crystal display (LCD) monitor.

The input devices 16 are used for inputting data into the digital computer 8.

The communication ports 20 are used for sharing data with the digital computer 8.

The communication ports 20 may comprise, for instance, universal serial bus (USB) ports for connecting a keyboard and a mouse to the digital computer 8.

The communication ports 20 may further comprise a data network communication port such as IEEE 802.3 port for enabling a connection of the digital computer 8 with an analog computer 10.

The skilled addressee will appreciate that various alternative embodiments of the communication ports 20 may be provided.

The memory unit 22 is used for storing computer-executable instructions.

The memory unit 22 may comprise a system memory such as a high-speed random access memory (RAM) for storing system control program (e.g., BIOS, operating system module, applications, etc.) and a read-only memory (ROM).

It will be appreciated that the memory unit 22 comprises, in one embodiment, an operating system module.

It will be appreciated that the operating system module may be of various types.

In one embodiment, the operating system module is OS X Yosemite manufactured by Apple™.

The memory unit 22 further comprises an application for estimating a thermodynamic property of a quantum Ising model with transverse field.

The memory unit 22 may further comprise an application for using the analog computer 10.

The memory unit 22 may further comprise quantum Ising model with transverse field data, such as a corresponding weight for each coupler of the quantum Ising model sampling device 28 and a corresponding bias for each qubit of the quantum Ising model sampling device 28.

The analog computer 10 further comprises a qubit control system 24, a readout control system 26, a quantum Ising model sampling device 28, and a coupling device control system 30.

The quantum Ising model sampling device 28 may be of various types, including but not limited to a quantum processor comprising superconducting qubits, a quantum device performing quantum gate model operations, an optical computing device, a central processing unit and a reconfigurable digital hardware and a central processing unit.

In the embodiment where the quantum Ising model sampling device 28 comprises an optical computing device, the optical computing device is operatively coupled to the processing device and configured to receive energy from an optical energy source and generate a plurality of optical parametric oscillators, and a plurality of coupling devices, each of which controllably couples a plurality of optical parametric oscillators.

In the embodiment where the quantum Ising model sampling device comprises a central processing unit, the central processing unit is operatively coupled to the processing device and a memory unit is coupled to the central processing unit, the memory unit comprises an application for obtaining data representative of the quantum Ising model with transverse field and the application is adapted for performing a simulated quantum annealing of the quantum Ising model with transverse field.

In the embodiment where the quantum Ising model sampling device comprises a reconfigurable digital hardware operatively coupled to the processing device, a central processing unit and a memory unit, the central processing unit and the memory unit are coupled to the reconfigurable digital hardware and the reconfigurable digital hardware is adapted to perform a simulated quantum annealing of the quantum Ising model with transverse field.

The readout control system 26 is used for reading the qubits of the quantum Ising model sampling device 28. In fact, it will be appreciated that in order for a quantum Ising model sampling device to be used in the method disclosed herein, a readout system that measures the qubits of the quantum system in their quantum mechanical states is required. A measurement provides a sample of the states of the qubits in the measurement basis. It will be appreciated that such configuration of states of the qubits can be referred to as a measured configuration. The results from the readings are provided to the digital computer 8.

In the embodiment where the quantum Ising model sampling device 28 is a quantum processor, the biases of the qubits are controlled via the qubit control system 24. The couplers are controlled via the coupling device control system 30. The coupling device control system 30 may comprise one or more coupling controllers for the coupling devices, also referred to as "couplers." Each coupling controller may be configured to tune the coupling weight of a corresponding coupling device from zero to a maximum value. It will be further appreciated that the coupling devices may be tuned, for instance, to provide ferromagnetic or antiferromagnetic coupling between the qubits of the quantum Ising model with transverse field. An example of such analog computer is disclosed in U.S. Pat. No. 8,421,053, and in U.S. Patent Application No. 2015/0046681.

It will be appreciated that the readout control system 26 may be of various types. For instance, in the embodiment, wherein the quantum Ising model sampling device 28 is a quantum processor the readout control system 26 may comprise a plurality of dc-SQUID magnetometers, each inductively connected to a different qubit of the quantum processor. The readout control system 26 may provide voltage or current values. In one embodiment, the dc-SQUID magnetometer comprises a loop of superconducting material interrupted by at least one Josephson junction, as is well known in the art.

Figure 2:
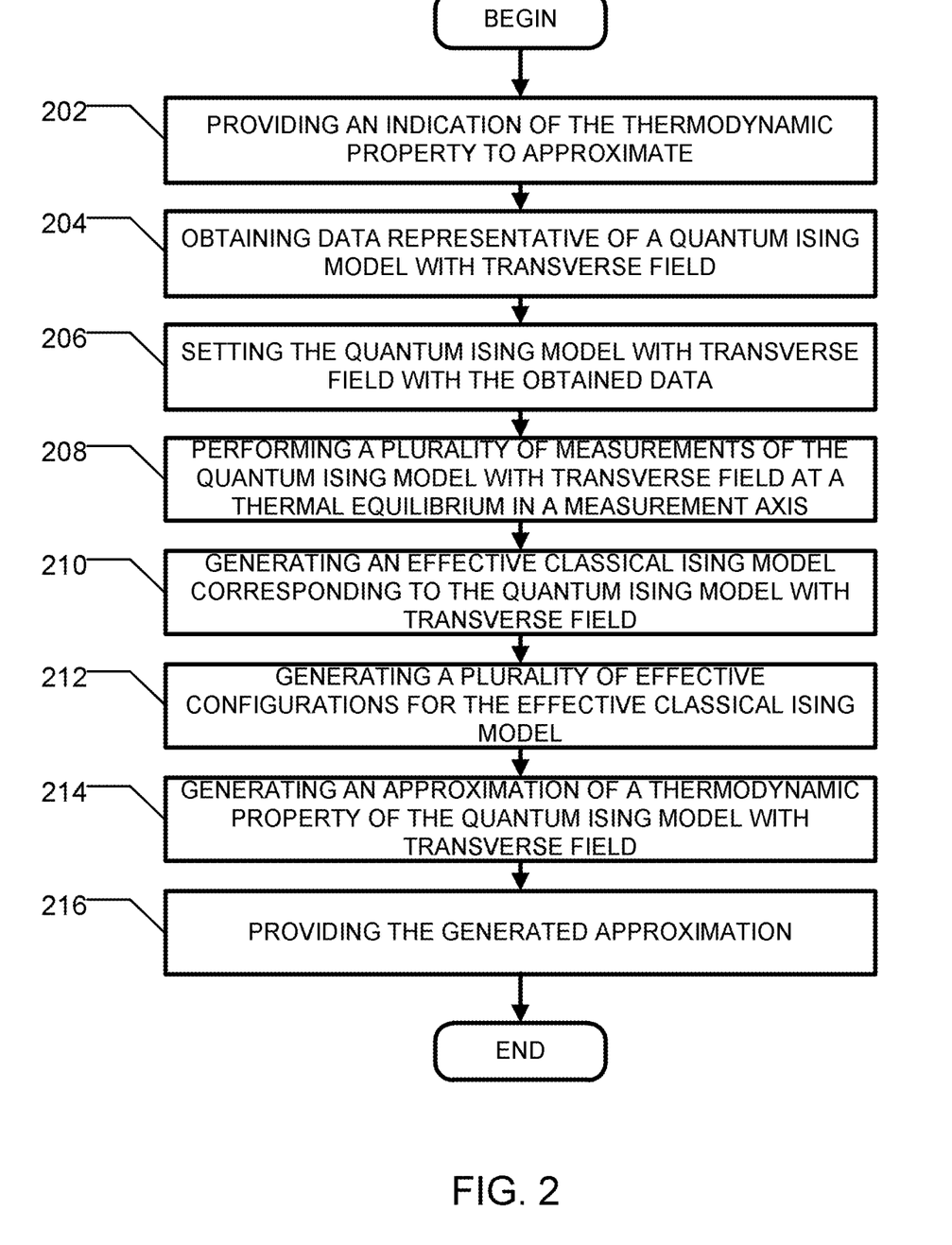
FIG. 2 is a flowchart which shows an embodiment of a method for estimating a thermodynamic property of a quantum Ising model with transverse field.

Now referring to FIG. 2, there is shown an embodiment of a method for estimating a thermodynamic property of a quantum Ising model with transverse field. It will be appreciated that the thermodynamic property may be of various types as disclosed herein. The thermodynamic property for which an estimation has to be determined is provided.

More precisely, and according to processing step 202, an indication of the thermodynamic property to approximate for the quantum Ising model with transverse field is provided. It will be appreciated that the indication of the thermodynamic property to approximate may be provided according to various embodiments. In one embodiment, the indication of the thermodynamic property to approximate is obtained from the digital computer 8. In an alternative embodiment, the indication of the thermodynamic property to approximate is obtained from a user interacting with the digital computer 8. In another alternative embodiment, the indication of the thermodynamic property to approximate is obtained from a remote processing unit operatively connected with the digital computer 8. The remote processing unit may be operatively connected with the digital computer 8 via a data network. The data network may be selected from a group consisting of a local area network (LAN), a metropolitan area network (MAN) and a wide area network (WAN). In one embodiment, the data network comprises the Internet.

Still referring to FIG. 2 and according to processing step 204, data representative of the quantum Ising model with transverse field is obtained.

As explained above, the quantum Ising model with transverse field consists of representations of spins in a measurement basis and the representations of spins in an independent basis. In one embodiment, the measurement basis is denoted by z and the independent basis is denoted by x.

It will be appreciated that the data representative of a quantum Ising model with transverse field comprises a plurality of qubits, a plurality of local field biases along the z-axis on the plurality of qubits, a plurality of coupling field strengths along the z-axis between a plurality of pairs of the plurality of qubits, and a plurality of local field biases along the x-axis on the plurality of qubits.

In one embodiment, the quantum Ising model with transverse field is $$H = -\sum_{i<j} J_{ij}\sigma_i^z\sigma_j^z - \sum_i h_i\sigma_i^z - \Gamma\sum_i \sigma_i^x.$$

In this embodiment, the data representative the quantum Ising model with transverse field comprises the plurality of qubits $\sigma_1^z, \ldots, \sigma_n^z$, the plurality of local field biases $(h_1, \ldots, h_n)$, the plurality of coupling strengths $(J_{11}, \ldots, J_{nn})$, and the transverse field bias $\Gamma$.

It will be appreciated that the data representative of a quantum Ising model with transverse field may be obtained according to various embodiments.

In one embodiment, the data representative of the quantum Ising model with transverse field are obtained using the digital computer 8. It will be appreciated that the data representative of the quantum Ising model with transverse field may be stored in the memory unit 22 of the digital computer 8.

In an alternative embodiment, the data representative of the quantum Ising model with transverse field may be provided by a user interacting with the digital computer 8.

In another alternative embodiment, the data representative of the quantum Ising model with transverse field are obtained from a remote processing unit, not shown, operatively coupled with the digital computer 8. The remote processing unit may be operatively coupled with the digital computer 8 according to various embodiments. In one embodiment, the remote processing unit is coupled with the digital computer 8 via a data network. The data network may be selected from a group consisting of a local area network (LAN), a metropolitan area network (MAN) and a wide area network (WAN). In one embodiment, the data network comprises the Internet.

Still referring to FIG. 2 and according to processing step 206, the quantum Ising model with transverse field is set on a quantum Ising model sampling device using the obtained data representative of the quantum Ising model with transverse field.

It will be appreciated that the quantum Ising model sampling device may be of various types.

In one embodiment, the quantum Ising model sampling device comprises a quantum processor comprising plurality of manufactured qubits, each qubit corresponding to a qubit in the plurality of qubits in the data representative of the quantum Ising model with transverse field. In this embodiment, the quantum processor comprises a group of tunable couplers. The group of couplers of this quantum processor comprises a plurality of couplers, each of which corresponding to one of the couplers in the plurality of coupler strengths in the data representative of the quantum Ising model with transverse field. In this embodiment, each qubit, is affected by a tunable magnetic flux threading through the qubit along the z-axis and a tunable magnetic field threading through the qubit along the x-axis, respectively representative of the local field biases in the z- and x-bases.

In another embodiment, the quantum processor comprises the D-Wave 2X System manufactured by D-Wave Systems, Ltd.

In another embodiment, the quantum Ising model sampling device comprises the optical device.

In another embodiment, the quantum Ising model sampling device comprises a central processing unit and a memory unit coupled to the central processing unit comprises an application for obtaining data representative of the quantum Ising model with transverse field; further wherein the application is adapted for performing a simulated quantum annealing of the quantum Ising model with transverse field.

It will be appreciated that the tunable couplers and local field biases of respectively each coupler and each qubit of the quantum Ising model sampling device may be programmed using the digital computer 8 and the quantum Ising model sampling device control system.

The device control system comprises the qubit control system 24 and the coupling device control system 30.

It will be appreciated that the couplers and local field biases of the qubits may be stored in the memory unit 22 of the digital computer 8.

In an alternative embodiment, the couplers and local field biases are provided by a user interacting with the digital computer 8.

In a further embodiment, the couplers and local field biases are provided by a remote processing unit operatively coupled with the digital computer 8 shown in FIG. 1.

Now referring back to FIG. 2, and according to processing step 208, a plurality of measurements of the quantum Ising model with transverse field is performed in the measurement axis (i.e., in the z-axis) using the quantum Ising sampling device, each measurement providing a corresponding measured configuration;

In one embodiment, each measurement corresponds to a read from the quantum annealer.

In another embodiment, each measurement corresponds to a read from the optical computing device.

In another embodiment, each measurement corresponds to a read from the simulated quantum annealing.

Still referring to FIG. 2 and according to processing step 210, an effective classical Ising model corresponding to the quantum Ising model with transverse field is generated. It will be appreciated that in one embodiment the effective classical Ising model corresponding to the quantum Ising model with transverse field is generated based on equation (2).

According to processing step 212, a plurality of effective configurations for the effective classical Ising model is generated. It will be appreciated that each effective configuration comprises a set of more than one of the measured configurations.

Figure 3:
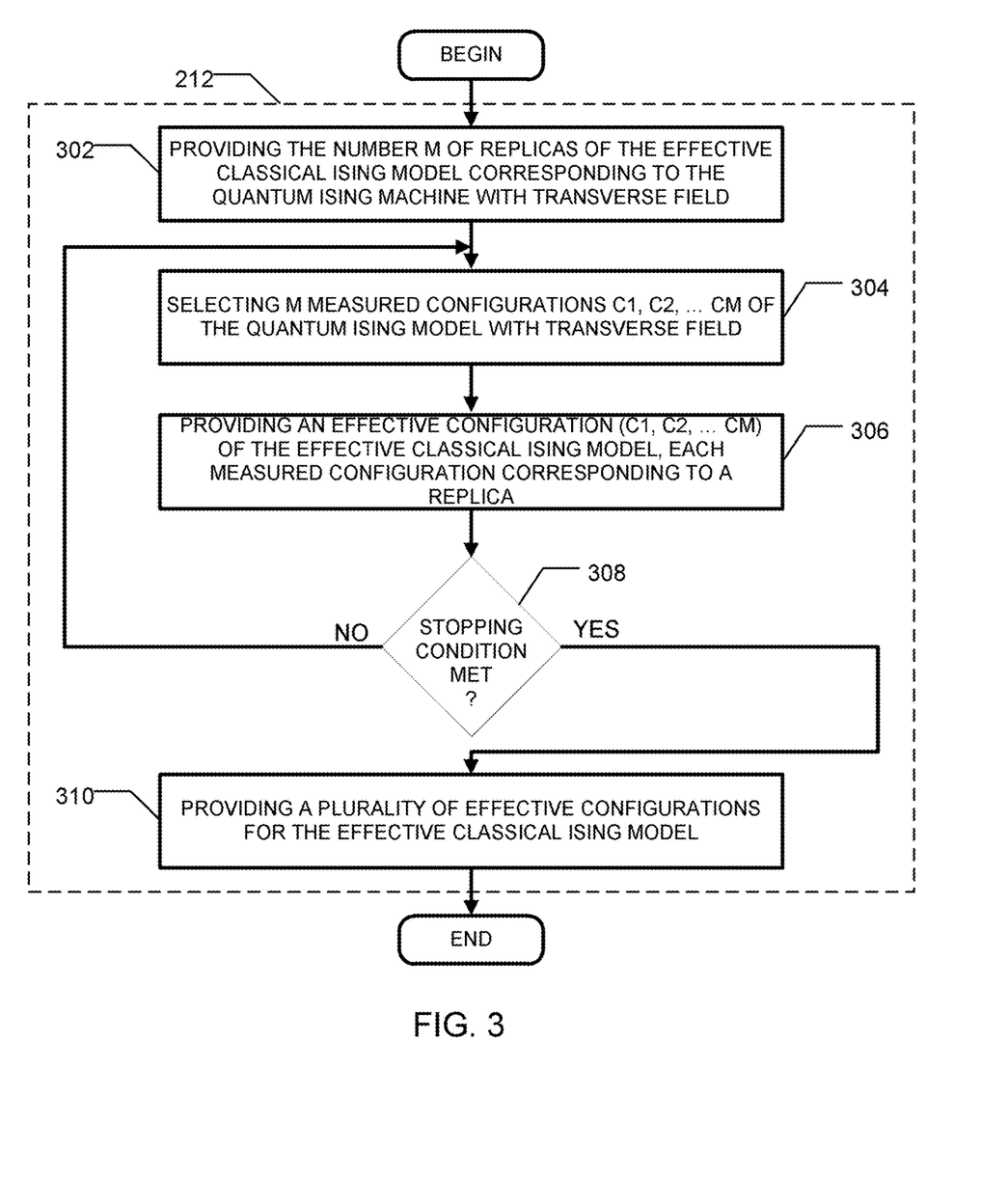
FIG. 3 is a flowchart which shows an embodiment for generating a plurality of effective configurations for the effective classical model.

Now referring to FIG. 3, there is shown an embodiment for performing, inter alia, the processing step 212.

It will be appreciated that in the embodiment where the quantum Ising model with transverse field is $$H = -\sum_{1 \leq i < j \leq n} J_{ij}\sigma_i^z\sigma_j^z - \sum_{1 \leq i \leq n} h_i\sigma_i^z - \Gamma \sum_{1 \leq i \leq n} \sigma_i^x \quad (1)$$

with n spins, the classical effective Hamiltonian comprises of m replicas of the spins of this Hamiltonian as disclosed herein.

Referring to FIG. 3, and according to processing step 302, a number m of replicas of the effective classical Ising model corresponding to the quantum Ising model with transverse field, is provided. It will be appreciated by the skilled addressee that replicas of the effective classical Ising model can be referred to as the copies of the spin system defined by the quantum Ising model with transverse field defined below and in particular in equation (2).

In one embodiment, the number m of replicas of the effective classical Ising model is obtained using the digital computer 8, and more precisely using the memory 22 of the digital computer 8.

In an alternative embodiment, the number m of replicas of the effective classical Ising model is provided to the digital computer 8 by a remote processing unit operatively coupled with the digital computer 8.

To each spin $\sigma_i$ is associated m spins denoted as $\sigma_i^1, \ldots, \sigma_i^m$. The bias on every spin $\sigma_i^k$ for i=1, ..., n and k=1, ..., m is set to $$\frac{h_i}{m}.$$

The coupling between every two spins $\sigma_i^k$ and $\sigma_j^k$ for $1 \leq i \neq j \leq n$ is set to $$\frac{J_{ij}}{m}.$$

For every k=1, ..., m−1 the coupling between every two spins $\sigma_i^k$ and $\sigma_i^{k+1}$ is set to $$\frac{1}{2\beta}$$

ln coth $$\left(\frac{\beta\Gamma}{m}\right).$$

The classical Hamiltonian of one dimension higher is therefore $$H(\sigma) = -\sum_{\substack{1 \leq i < j \leq n \\ 1 \leq k \leq m}} \frac{J_{ij}}{m}\sigma_i^k\sigma_j^k - \sum_{\substack{1 \leq i \leq n \\ 1 \leq k \leq m}} \frac{h_i}{m}\sigma_i^k - \quad (2)$$

$$\frac{1}{2\beta}\text{lncoth}\left(\frac{\beta\Gamma}{m}\right)\left(\sum_{\substack{1 \leq i \leq n \\ 1 \leq k \leq m-1}} \sigma_i^k\sigma_i^{k+1} + \sigma_i^1\sigma_i^m\right)$$

Figure 4:
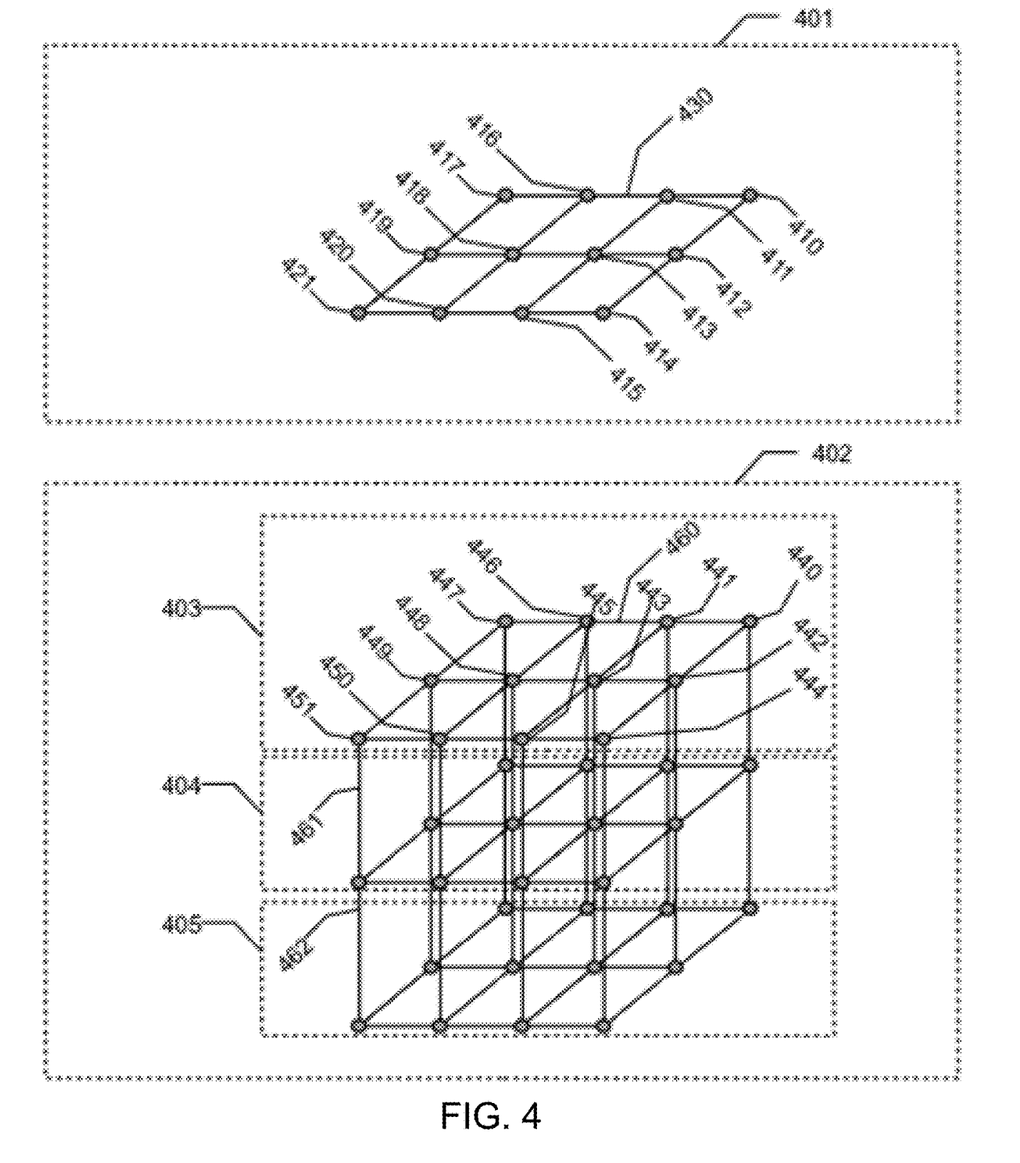
FIG. 4 is a diagram which shows an embodiment of a 2-dimensional quantum Ising model with a transverse field and an associated 3-dimensional classical Ising model.

Now referring to FIG. 4, there is shown an embodiment of a 2-dimensional quantum Ising model with transverse field, 401, in n=12 spins and an associated 3-dimensional classical Ising model, 402.

Spins 410-421 are the 12 spins in the quantum Ising model 401.

The classical Ising model, 402, comprises of m=3 replicas 403, 404, and 405 of the quantum Ising model 401 restricted to its z-axis terms.

For example, in the replica 403, the spins 440 to 451 are replicas of spins 410 to 421.

The coupling 460 has a strength ⅓ of the coupling 430.

The couplings 461 and 462, have each a strength of $$\frac{1}{2\beta}$$

ln coth $$\left(\frac{\beta\Gamma}{3}\right).$$

Now referring back to FIG. 3, and according to processing step 304, m measured configurations of the quantum Ising model with transverse field are selected.

In one embodiment, the selection of m measured configurations of the quantum Ising model with transverse field is performed randomly.

In the embodiment where the quantum Ising model with transverse field comprises n qubits and the effective classical Ising Hamiltonian comprises m replicas, the measured configurations of the quantum Ising model with transverse field are $c_1, \ldots, c_m$ where each configuration $c_i$ is a configuration $(c_i^1, \ldots, c_i^n)$ of spins in the z-axis.

Still referring to FIG. 3 and according to processing step 306, an effective configuration c of the effective classical Ising model is provided.

In the embodiment discussed above, the configuration $c_i$ corresponds to replica i.

In an alternative embodiment, the match between the replicas and the measured configurations is decided based on the following Markov Chain Monte Carlo procedure. In this embodiment, the measured configurations are first matched to the replicas uniformly at random. A transition is then performed to a different arrangement with Metropolis acceptance probability. For example, two measured configurations may be chosen at random and exchanged with probability $$p(c, c') = \min\{1, \exp(\beta(E(c') - E(c)))\}$$

where $$E(c) = \frac{1}{2\beta} \ln\coth\left(\frac{\beta \Gamma}{m}\right) \left( \sum_{\substack{1 \leq i \leq n \\ 1 \leq k \leq m-1}} \sigma_i^k \sigma_i^{k+1} + \sigma_i^1 \sigma_i^m \right)$$

According to processing step 308, a test is performed in order to find out if a stopping condition is met.

It will be appreciated that the stopping condition may be of various types. In one embodiment, the stopping condition comprises a stopping criterion. In one embodiment, the stopping criterion comprises reaching a maximum number of samples of the classical effective Hamiltonian.

It will be appreciated that the stopping criterion may alternatively comprise reaching a maximum runtime.

It will be appreciated that the stopping criterion may alternatively comprise convergence of the approximation of the thermodynamic property of the quantum Ising model with transverse field.

In one embodiment, the test may comprise more than one stopping criterion.

In the case where the stopping condition is not met and according to processing step 304, another plurality of m measured configurations of the quantum Ising model with transverse field is selected and according to processing step 306, another effective configuration of the effective classical Ising model is provided.

In the case where the stopping condition is met and according to processing step 310, a plurality of configurations of the effective classical Ising model is provided.

It will be appreciated that processing steps 302-310 of FIG. 3 are one embodiment of the processing step 210 shown in FIG. 2.

Now referring back to FIG. 2, and according to processing step 214, an approximation of the thermodynamic property of the quantum Ising model with transverse field is calculated.

According to this processing step 214, an approximation of the thermodynamic property of the effective classical Ising model is generated using the generated plurality of effective configurations of the effective classical Ising model. The approximation of the thermodynamic property of the effective classical Ising model is then provided as an approximation of the thermodynamic property of the quantum Ising model with transverse field.

In one embodiment, the thermodynamic property of the effective classical Ising model is the partition function of the classical (sing model calculated via $Z = \Sigma_c e^{-\beta H(c)}$, and using the plurality of effective configurations of the effective classical Ising model from processing step 212.

In an alternative embodiment, the thermodynamic property of the effective classical Ising model is the entropy of the classical Ising model calculated via $S = -\Sigma_c \mathbb{P}(c) \ln(\mathbb{P}(c))$, and using the plurality of effective configurations of the effective classical Ising model from processing step 212.

In another alternative embodiment, the thermodynamic property of the effective classical Ising model is the equilibrium free energy of the classical Ising model calculated by $$F = \sum_c \mathbb{P}(c) H(c) - \frac{1}{\beta} \sum_c \mathbb{P}(c) \ln(\mathbb{P}(c)),$$

and using the plurality of effective configurations of the effective classical Ising model from processing step 212.

According to processing step 216, the generated approximation of the thermodynamic property of the quantum Ising model with transverse field is provided.

It will be appreciated that the approximation of the thermodynamic property of the quantum Ising model with transverse field may be provided according to various embodiments. In fact, it will be appreciated that the approximation of the thermodynamic property of the quantum Ising model with transverse field is provided using the digital computer 8 shown in FIG. 1.

In one embodiment, the approximation of the thermodynamic property of the quantum Ising model with transverse field is stored in the digital computer 8, and more precisely in the memory 22 of the digital computer 8.

In an alternative embodiment, the approximation of the thermodynamic property of the quantum Ising model with transverse field is displayed to a user interacting with the digital computer 8 via the display device 14.

In another alternative embodiment, the approximation of the thermodynamic property of the quantum Ising model with transverse field is transmitted to a remote processing unit operatively coupled with the digital computer 8.

It will be appreciated that a non-transitory computer-readable storage medium is further disclosed for storing computer-executable instructions which, when executed, cause a digital computer to perform a method for estimating a thermodynamic property of a quantum Ising model with transverse field, the method comprising obtaining an indication of a thermodynamic property to approximate for the quantum Ising model with transverse field; obtaining data representative of a quantum Ising model with transverse field; setting the quantum Ising model with transverse field using the obtained data representative of the quantum Ising model with transverse field on a quantum Ising model sampling device; performing a plurality of measurements of the quantum Ising model with transverse field in a measurement axis using the quantum Ising sampling device, each measurement providing a corresponding measured configuration; generating an effective classical Ising model corresponding to the quantum Ising model with transverse field; generating a plurality of effective configurations of the effective classical Ising model, each effective configuration comprising a set of more than one of the measured configurations; generating an approximation of the thermodynamic property of the effective classical Ising model using the generated plurality of effective configurations of the effective classical Ising model to approximate the thermodynamic property of the quantum Ising model with transverse field; and providing the generated approximation of the thermodynamic property.

It will be appreciated that the application for estimating a thermodynamic property of a quantum Ising model with transverse field comprises instructions for obtaining an indication of a thermodynamic property to approximate for the quantum Ising model with transverse field. The application for estimating a thermodynamic property of a quantum Ising model with transverse field further comprises instructions for obtaining data representative of a quantum Ising model with transverse field. The application for estimating a thermodynamic property of a quantum Ising model with transverse field further comprises instructions for setting the quantum Ising model with transverse field using the obtained data representative of the quantum Ising model with transverse field on a quantum Ising model sampling device. The application for estimating a thermodynamic property of a quantum Ising model with transverse field further comprises instructions for performing a plurality of measurements of the quantum Ising model with transverse field in a measurement axis using the quantum Ising sampling device, each measurement providing a corresponding measured configuration. The application for estimating a thermodynamic property of a quantum Ising model with transverse field further comprises instructions for generating an effective classical Ising model corresponding to the quantum Ising model with transverse field. The application for estimating a thermodynamic property of a quantum Ising model with transverse field further comprises instructions for generating a plurality of effective configurations of the effective classical Ising model, each effective configuration comprising a set of more than one of the measured configurations. The application for estimating a thermodynamic property of a quantum Ising model with transverse field further comprises instructions for generating an approximation of the thermodynamic property of the effective classical Ising model using the generated plurality of effective configurations of the effective classical Ising model to approximate the thermodynamic property of the quantum Ising model with transverse field. The application for estimating a thermodynamic property of a quantum Ising model with transverse field further comprises instructions for providing the generated approximation of the thermodynamic property.

An advantage of the method disclosed herein is that it provides a method for approximating a thermodynamic property of a quantum Ising model with transverse field.

Another advantage of the method disclosed herein is that it does not require finding the spectrum of the quantum Hamiltonian.

Although the above description relates to specific embodiments as presently contemplated by the inventors, it will be understood that the invention in its broad aspect includes functional equivalents of the elements described herein.

The invention claimed is:

1. A method for estimating a thermodynamic property of a quantum Ising model with transverse field, the method comprising:
use of a processing device for:
obtaining an indication of the thermodynamic property to approximate for the quantum Ising model with transverse field, the thermodynamic property selected from the group consisting of internal energy, free energy, entropy, and partition function or without finding the spectrum of the quantum Hamiltonian;
obtaining data representative of the quantum sing model with transverse field;
setting the quantum Ising model with transverse field using the obtained data representative of the quantum Ising model with transverse field on a quantum Ising model sampling device, the quantum Ising model sampling device being operatively coupled to the processing device and to a quantum Ising model sampling device control system;
performing a plurality of measurements of the quantum Ising model with transverse field in a measurement axis using the quantum Ising model sampling device, each measurement providing a corresponding measured configuration;
generating an effective classical Ising model corresponding to the quantum Ising model with transverse field;
generating a plurality of effective configurations of the effective classical Ising model, each effective configuration comprising a set of more than one of the measured configurations;
generating an approximation of a thermodynamic property of the effective classical Ising model using the generated plurality of effective configurations of the effective classical Ising model to approximate the thermodynamic property of the quantum Ising model with transverse field; and
providing the approximation of the thermodynamic property.

2. The method as claimed in claim 1, wherein the quantum Ising model sampling device comprises a quantum processor operatively coupled to the processing device, further wherein the quantum Ising model sampling device control system comprises a quantum processor control system; further wherein the quantum processor comp sing a plurality of qubits and a plurality of couplers, each coupler providing a communicative coupling at a crossing of two qubits.

3. The method as claimed in claim 1, wherein the quantum Ising model sampling device comprises an optical computing device operatively coupled to the processing device and configured to receive energy from an optical energy source and generate a plurality of optical parametric oscillators, and a plurality of coupling devices, each of which controllably couples a plurality of optical parametric oscillators.

4. The method as claimed in claim 1, wherein the quantum Ising model sampling device comprises a central processing unit operatively coupled to the processing device and a memory unit coupled to the central processing unit, the memory unit comprising an application for obtaining data representative of the quantum Ising model with transverse field; further wherein the application performs a simulated quantum annealing of the quantum Ising model with transverse field.

5. The method of claim 1, wherein the quantum Ising model sampling device comprises a reconfigurable digital hardware operatively coupled to the processing device, a central processing unit and a memory unit, the central processing unit and the memory unit coupled to the reconfigurable digital hardware; wherein the reconfigurable digital hardware performs a simulated quantum annealing of the quantum Ising model with transverse field.

6. The method as claimed in claim 2, wherein the quantum Ising model with transverse field is characterized by a quantum Ising Hamiltonian with transverse field; further wherein the thermodynamic property of the quantum Ising model with transverse field comprises a partition function of the quantum Ising Hamiltonian with transverse field.

7. The method as claimed in claim 3, wherein the quantum Ising model with transverse field is characterized by a quantum Ising Hamiltonian with transverse field; further wherein the thermodynamic property of the quantum Ising model with transverse field comprises a partition function of the quantum Ising Hamiltonian with transverse field.

8. The method as claimed in claim 4, wherein the quantum Ising model with transverse field is characterized by a quantum Ising Hamiltonian with transverse field; further wherein the thermodynamic property of the quantum Ising model with transverse field comprises a partition function of the quantum Ising Hamiltonian with transverse field.

9. The method as claimed in claim 5, wherein the quantum Ising model with transverse field is characterized by a quantum Ising Hamiltonian with transverse field; farther wherein the thermodynamic property of the quantum Ising model with transverse field comprises a partition function of the quantum Ising Hamiltonian with transverse field.

10. The method as claimed in claim 2, wherein the quantum Ising model with transverse field is characterized by a quantum Ising Hamiltonian with transverse field; further wherein the thermodynamic property of the quantum Ising model with transverse field comprises an equilibrium free energy of the quantum Ising Hamiltonian with transverse field.

11. The method as claimed in claim 3, wherein the quantum Ising model with transverse field is characterized by a quantum Ising Hamiltonian with transverse field; further wherein the thermodynamic property of the quantum Ising model with transverse field comprises an equilibrium free energy of the quantum Ising Hamiltonian with transverse field.

12. The method as claimed in claim 4, wherein the quantum Ising model with transverse field is characterized by a quantum Ising Hamiltonian with transverse field; further wherein the thermodynamic property of the quantum Ising model with transverse field comprises an equilibrium free energy of the quantum Ising Hamiltonian with transverse field.

13. The method as claimed in claim 5, wherein the quantum Ising model with transverse field is characterized by a quantum Ising Hamiltonian with transverse field; further wherein the thermodynamic property of the quantum Ising model with transverse field comprises an equilibrium free energy of the quantum Ising Hamiltonian with transverse field.

14. The method as claimed in claim 2, wherein the quantum Ising model with transverse field is characterized by a quantum Ising Hamiltonian with transverse field; further wherein the thermodynamic property of the quantum Ising model with transverse field comprises an internal energy of the quantum Ising Hamiltonian with transverse field.

15. The method as claimed in claim 3, wherein the quantum Ising model with transverse field is characterized by a quantum Ising Hamiltonian with transverse field; further wherein the thermodynamic property of the quantum Ising model with transverse field comprises an internal energy of the quantum Ising Hamiltonian with transverse field.

16. The method as claimed in claim 4, wherein the quantum Ising model with transverse field is characterized by a quantum Ising Hamiltonian with transverse field; further wherein the thermodynamic property of the quantum Ising model with transverse field comprises an internal energy of the quantum Ising Hamiltonian with transverse field.

17. The method as claimed in claim 5, wherein the quantum Ising model with transverse field is characterized by a quantum Ising Hamiltonian with transverse field; further wherein the thermodynamic property of the quantum Ising model with transverse field comprises an internal energy of the quantum Ising Hamiltonian with transverse field.

18. The method as claimed in claim 2, wherein the quantum Ising model is characterized by a quantum Ising Hamiltonian with transverse field; further wherein the thermodynamic property of the quantum Ising model with transverse field comprises an entropy of the quantum Ising Hamiltonian with transverse field.

19. The method as claimed in claim 3, wherein the quantum Ising model is characterized by a quantum Ising Hamiltonian with transverse field; further wherein the thermodynamic property of the quantum Ising model with transverse field comprises an entropy of the quantum Ising Hamiltonian with transverse field.

20. The method as claimed in claim 4, wherein the quantum Ising model is characterized by a quantum Ising Hamiltonian with transverse field; further wherein the thermodynamic property of the quantum Ising model with transverse field comprises an entropy of the quantum Ising Hamiltonian with transverse field.

21. The method as claimed in claim 5, wherein the quantum Ising model is characterized by a quantum Ising Hamiltonian with transverse field; further wherein the thermodynamic property of the quantum Ising model with transverse field comprises an entropy of the quantum Ising Hamiltonian with transverse field.

22. The method as claimed in claim 2, wherein the effective classical Ising model comprises more than one replica of each spin of the quantum Ising model with transverse field projected on its measurement base.

23. The method as claimed in claim 3, wherein the effective classical Ising model comprises more than one replica of each spin of the quantum Ising model with transverse field projected on its measurement base.

24. The method as claimed in claim 4, wherein the effective classical Ising model comprises mom than one replica of each spin of the quantum Ising model with transverse field projected on its measurement base.

25. The method as claimed in claim 5, wherein the effective classical Ising model comprises more than one replica of each spin of the quantum Ising model with transverse field projected on its measurement base.

26. The method as claimed in claim 22, wherein generating each effective configuration for the effective classical Ising model comprises performing a random sampling of the plurality of measured configurations of the quantum Ising model with transverse field; each selected measured configuration corresponding to a replica of the effective classical Ising model.

27. The method as claimed in claim 23, wherein generating each effective configuration for the effective classical Ising model comprises performing a random sampling of the plurality of measured configurations of the quantum Ising model with transverse field; each selected measured configuration corresponding to a replica of the effective classical Ising model.

28. The method as claimed in claim 24, wherein generating each effective configuration for the effective classical Ising model comprises performing a random sampling of the plurality of measured configurations of the quantum Ising model with transverse field; each selected measured configuration corresponding to a replica of the effective classical Ising model.

29. The method as claimed in claim 25, wherein generating each effective configuration for the effective classical Ising model comprises performing a random sampling of the plurality of measured configurations of the quantum Ising model with transverse field; each selected measured configuration corresponding to a replica of the effective classical Ising model.

30. The method as claimed in claim 1, wherein the indication of the thermodynamic property to approximate for the quantum Ising model with transverse field is obtained from at least one of the processing device, a remote processing device operatively connected with the processing device and a user interacting with the processing device.

31. The method as claimed in claim 1, wherein the generating of a plurality of effective configurations for the effective classical Ising model comprises:
providing a number m of replicas of the effective classical Ising model corresponding to the quantum Ising model with transverse field,
until a stopping criterion is met:
selecting m measured configurations of the quantum Ising model with transverse field,
providing an effective configuration of the effective classical Ising model using the m measured configurations of the quantum Ising model with transverse field, by matching the m measured configurations with the m replicas,
if the stopping criterion is met:
providing the plurality of effective configurations of the effective classical Ising model.

32. The method as claimed in claim 31, wherein the m measured configurations of the quantum Ising model with transverse field are selected randomly.

33. The method as claimed in claim 31, wherein the matching between the m replicas and the m measured configurations is decided based on a Markov Chain Monte Carlo procedure, comprising first matching the m measured configurations to the m replicas uniformly at random and then performing a transition to a different arrangement with a Metropolis acceptance probability.

34. The method as claimed in claim 31, wherein the stopping criterion comprises reaching a maximum number of samples of a classical effective Hamiltonian.

35. The method as claimed in claim 31, wherein the stopping criterion comprises reaching a maximum runtime.

36. The method as claimed in claim 31, wherein the stopping criterion comprises convergence of an approximation of the thermodynamic property of the quantum Ising model with transverse field.

37. A digital computer for estimating a thermodynamic property of a quantum Ising model with transverse field, the digital computer comprising:
a central processing unit;
a display device;
a communication port for operatively connecting a quantum Ising model sampling device, the quantum Ising model sampling device operatively coupled to a quantum Ising model sampling device control system;
a memory unit comprising an application for estimating a thermodynamic property of a quantum Ising model with transverse field, the thermodynamic property selected from the group consisting of internal energy, free energy, entropy, god partition function or without finding the spectrum of the quantum Hamiltonian, the application comprising:
instructions for obtaining an indication of the thermodynamic property to approximate for the quantum Ising model with transverse field,
instructions for obtaining data representative of the quantum Ising model with transverse field,
instructions for setting the quantum Ising model with transverse field using the obtained data representative of the quantum Ising model with transverse field on the quantum Ising model sampling device operatively coupled to the digital computer via the communication port,
instructions for performing a plurality of measurements of the quantum Ising model with transverse field in a measurement axis using the quantum Ising sampling device, each measurement providing a corresponding measured configuration,
instructions for generating an effective classical Ising model corresponding to the quantum Ising model with transverse field,
instructions for generating a plurality of effective configurations of the effective classical Ising model, each effective configuration comprising a set of more than one of the measured configurations,
instructions for generating an approximation of the thermodynamic property of the effective classical Ising model using the generated plurality of effective configurations of the effective classical Ising model to approximate the thermodynamic property of the quantum Ising model with transverse field, and
instructions for providing the generated approximation of the thermodynamic property; and
a data bus for interconnecting the central processing unit, the display device, the communication port and the memory unit.

38. A non-transitory computer-readable storage medium for storing computer-executable instructions which, when executed, cause a digital computer to perform a method for estimating a thermodynamic property of a quantum Ising model with transverse field, the method comprising:
use of a processing device for
selecting the thermodynamic property from the group consisting of internal energy, free energy, entropy, and partition function or without finding the spectrum of the quantum Hamiltonian;
obtaining an indication of the thermodynamic property to approximate for the quantum Ising model with transverse field;
obtaining data representative of the quantum Ising model with transverse field;
setting the quantum Ising model with transverse field using the obtained data representative of the quantum Ising model with transverse field on a quantum Ising model sampling device, the quantum Ising model sampling device being operatively coupled to the processing device and to a quantum Ising model sampling device control system;

performing a plurality of measurements of the quantum Ising model with transverse field in a measurement axis using the quantum Ising sampling device, each measurement providing a corresponding measured configuration;

generating an effective classical Ising model corresponding to the quantum Ising model with transverse field;

generating a plurality of effective configurations of the effective classical Ising model, each effective configuration comprising a set of more than one of the measured configurations;

generating an approximation of the thermodynamic property of the effective classical Ising model using the generated plurality of effective configurations of the effective classical Ising model to approximate the thermodynamic property of the quantum Ising model with transverse field; and providing the approximation of the thermodynamic property.

* * * * *